UNITED STATES PATENT OFFICE.

FELIX RICHTER, OF FRANKFORT-ON-THE-MAIN, AND LUDWIG VON ORTH, OF CHARLOTTENBURG, GERMANY.

PROCESS OF MANUFACTURING STRONGLY-ABSORBENT COAL.

1,027,153. Specification of Letters Patent. Patented May 21, 1912.

No Drawing. Application filed November 9, 1910. Serial No. 591,480.

*To all whom it may concern:*

Be it known that we, FELIX RICHTER and LUDWIG VON ORTH, citizens of the German Empire, residing, respectively, at Frankfort-on-the-Main and Charlottenburg, near Berlin, Germany, have invented certain new and useful Improvements in and Relating to Processes of Manufacturing Strongly-Absorbent Coal, of which the following is a specification.

Our invention relates to that type of process of manufacturing absorbent carbon in which a mixture of mineral matter and carbonaceous material is subjected to dry distillation.

Our invention consists more particularly in the use of ashes as mineral matter in a process of the said kind. We have found that the particles of ashes have a suitable degree of fineness for securing a very fine division of the active carbon and that the active carbon deposited on said particles of ashes during the process of dry distillation adheres firmly to said particles. The use of ashes as the mineral ingredient, moreover, cheapens the process of manufacturing strongly absorbent carbon and results in certain further advantages which will become clear hereafter.

In the carrying through of the process we may proceed as follows: we intimately mix a portion of ashes, such as ashes of browncoal, with finely-divided coal in natural condition, so that, for example, 6 parts of ashes are taken to 5 parts of finely-divided coal. This mixture is introduced in a known manner into a suitable retort or muffle and heated with exclusion of air up to 600° to 800° centigrade. In order to secure good results, care must be taken that the necessary temperature is attained in a short period of time so that the whole process of dry distillation is finished say in one hour.

Instead of using ashes which are obtained by burning natural coal, ashes may be employed which are obtained by the burning of used up absorbent carbon. In this way, one portion of absorbent carbon after being used up affords the mineral matter for manufacturing a new portion of absorbent carbon. If the same ashes are used in the process of manufacturing absorbent carbon again and again, and if the absorbent carbon is used up, for instance, in purifying city sewage which contains organic matter, together with phosphorus compounds, then the ashes of such used up absorbent carbon becomes more and more rich in phosphorus, so that finally ashes are obtained which are suitable for fertilizing purposes.

Instead of subjecting a mixture of ashes with natural coal to dry distillation, we may use a mixture of ashes and used up absorbent carbon, especially that laden with organic matter such as is deposited on the carbon during the purifying of city sewage. If we subject such mixture to dry distillation in retorts or muffles with exclusion of air, the organic matter deposited on the particles of absorbent carbon is converted substantially into active carbon and in this way utilized for the manufacture of absorbent carbon for purifying new portions of sewage. This embodiment of the process may be effected by burning a comparatively small part of a portion of used up absorbent carbon, mixing the ashes resulting from such burning with the larger part of said portion of used up absorbent carbon, and thereafter subjecting such mixture to dry distillation. It is true that if such process is repeated again and again the absorbent coal is gradually laden with coarser particles contained in sewage or other liquids purified by the absorbent carbon, but the process may be repeated a number of times without materially diminishing the activity of the carbon. In the course of such repeated procedures the absorbent carbon becomes more and more rich in phosphorus combinations as above stated. At the same time, in most cases, lime compounds are incorporated in the carbon depending on the quality of the sewage to be purified. If such carbon after being used up, is burned, a residue of ashes rich in phosphorus and phosphorus compounds and lime compounds is obtained which may be used as fertilizer, as above stated. It appears from the foregoing that the described procedure results in a process which is to a certain extent cyclical. Used up absorbent carbon is converted into fresh absorbent carbon not only by regeneration, but by adding new active substance from the conversion of organic matter into active carbon by the dry distillation.

Relating to the production of a phosphoric fertilizing material, it may be stated that it has been found that the ashes of an absorbent carbon material substantially free from phosphorus, after being used to purify sewage, contained about 2.5% phosphoric acid. If now such ashes were used for the production of a new portion of absorbent carbon and if such process was repeated five times, using always the ashes of the used up carbon as mineral addition for the manufacture of new portions of active carbon, then the ashes of the final portion of absorbent carbon after being used up contained about 12% of phosphoric salts.

Of course ashes of used up absorbent carbon may be employed in combination with other finely divided mineral material such as clay and lime for the manufacture of absorbent carbon. The ashes may furthermore be added not to the dry coal material but to the sewage to be purified, so that the sediment resulting from the purifying process is directly formed by mixture containing ashes and used up absorbent carbon.

Other modifications of the process will be obvious to experts and need not be mentioned in detail.

We claim:

1. The process of manufacturing strongly absorbent carbon, which consists in subjecting a finely-divided mixture comprising mineral matter which contains ashes and carbonaceous materials to dry distillation at a temperature below the melting point of either component of the mixture.

2. The process of manufacturing strongly absorbent carbon, which consists in subjecting a finely-divided mixture substantially consisting of ashes and of carbonaceous materials to dry distillation at a temperature below the melting point of either component of the mixture.

3. The process of manufacturing strongly absorbent carbon, which consists in mixing ashes with used up absorbent carbon and subjecting said mixture to dry distillation.

4. The process of manufacturing strongly absorbent carbon, which consists in mixing ashes with absorbent carbon containing organic matter and subjecting said mixture to dry distillation.

5. The process of manufacturing strongly absorbent carbon, which consists in subjecting a finely-divided mixture comprising carbonaceous material and mineral matter which contains ashes of used up absorbent carbon to dry distillation.

6. The process of manufacturing strongly absorbent carbon which consists in subjecting a finely-divided mixture substantially consisting of carbonaceous material and ashes of used up absorbent carbon to dry distillation.

7. The process of manufacturing strongly absorbent carbon, which consists in subjecting a finely-divided mixture comprising used up absorbent carbon and mineral matter which contains ashes of used up absorbent carbon to dry distillation.

8. The process of manufacturing strongly absorbent carbon, which consists in subjecting a finely-divided mixture substantially consisting of used up absorbent carbon and of ashes of used up absorbent carbon to dry distillation.

9. The process of manufacturing strongly absorbent carbon, which consists in mixing ashes of used up absorbent carbon with finely-divided carbonaceous materials and subjecting said mixture to dry distillation.

10. The process of manufacturing strongly absorbent carbon, which consists in mixing ashes of used up absorbent carbon with finely-divided used up absorbent carbon laden with organic matter and subjecting said mixture to dry distillation.

11. The process of manufacturing strongly absorbent carbon, which consists in mixing ashes of used up absorbent carbon with finely-divided used up absorbent carbon laden with organic matter containing combinations of phosphorus and subjecting said mixture to dry distillation.

12. In a process of manufacturing strongly absorbent carbon by subjecting a mixture of used up absorbent carbon and of ashes of used up absorbent carbon to dry distillation, the repeated use of the same ashes in the production of the mixture to be subjected to dry distillation.

13. In a process of manufacturing strongly absorbent carbon by subjecting a mixture of used up absorbent carbon laden with organic matter containing combinations of phosphorus and of ashes of used up absorbent carbon to dry distillation, the repeated use of the same ashes in production of the mixture to be subjected to dry distillation.

In testimony whereof, we affix our signatures in presence of two witnesses.

FELIX RICHTER.
LUDWIG von ORTH.

Witnesses:
 WOLDEMAR HAUPT,
 HENRY HASPER.